United States Patent
Workman et al.

(10) Patent No.: US 7,395,697 B2
(45) Date of Patent: Jul. 8, 2008

(54) FORCE METHOD FOR DETERMINING THE SPRING CONSTANT OF SCANNING PROBE MICROSCOPE CANTILEVERS USING MEMS ACTUATORS

(75) Inventors: Richard K. Workman, Los Altos, CA (US); Storrs T. Hoen, Brisbane, CA (US); George M. Clifford, Jr., Los Altos Hills, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 58 days.

(21) Appl. No.: 11/458,017

(22) Filed: Jul. 17, 2006

(65) Prior Publication Data

US 2008/0011044 A1    Jan. 17, 2008

(51) Int. Cl.
*G01B 5/28* (2006.01)
(52) U.S. Cl. .................................................. 73/105
(58) Field of Classification Search .................... 73/105
See application file for complete search history.

(56) References Cited

U.S. PATENT DOCUMENTS

| | | | | |
|---|---|---|---|---|
| 5,224,376 A | * | 7/1993 | Elings et al. | 73/105 |
| 5,483,822 A | * | 1/1996 | Albrecht et al. | 73/105 |
| 5,602,330 A | * | 2/1997 | Chamberlin et al. | 73/105 |
| 6,073,484 A | * | 6/2000 | Miller et al. | 73/105 |
| 6,145,374 A | * | 11/2000 | Zypman Niechonski et al. | 73/105 |
| 6,452,170 B1 | * | 9/2002 | Zypman et al. | 250/306 |
| 6,497,141 B1 | * | 12/2002 | Turner et al. | 73/105 |
| 6,545,495 B2 | * | 4/2003 | Warmack et al. | 324/762 |
| 6,734,425 B2 | * | 5/2004 | Hantschel et al. | 250/306 |
| 7,246,513 B2 | * | 7/2007 | Cumpson | 73/1.79 |
| 2002/0162388 A1 | * | 11/2002 | Proksch | 73/105 |
| 2003/0041669 A1 | * | 3/2003 | Degertekin et al. | 73/651 |
| 2005/0195407 A1 | * | 9/2005 | Nordin et al. | 356/501 |
| 2006/0101895 A1 | * | 5/2006 | Cumpson | 73/1.08 |
| 2006/0112760 A1 | * | 6/2006 | Hansma et al. | 73/105 |

FOREIGN PATENT DOCUMENTS

WO    WO 2004/104516 A2  *  12/2004

* cited by examiner

*Primary Examiner*—Michael Cygan

(57) ABSTRACT

In accordance with the invention, the spring constant of a scanning probe microscope cantilever mechanically coupled to a MEMs actuator may be determined in-situ by application of a force to the scanning probe microscope cantilever.

20 Claims, 10 Drawing Sheets

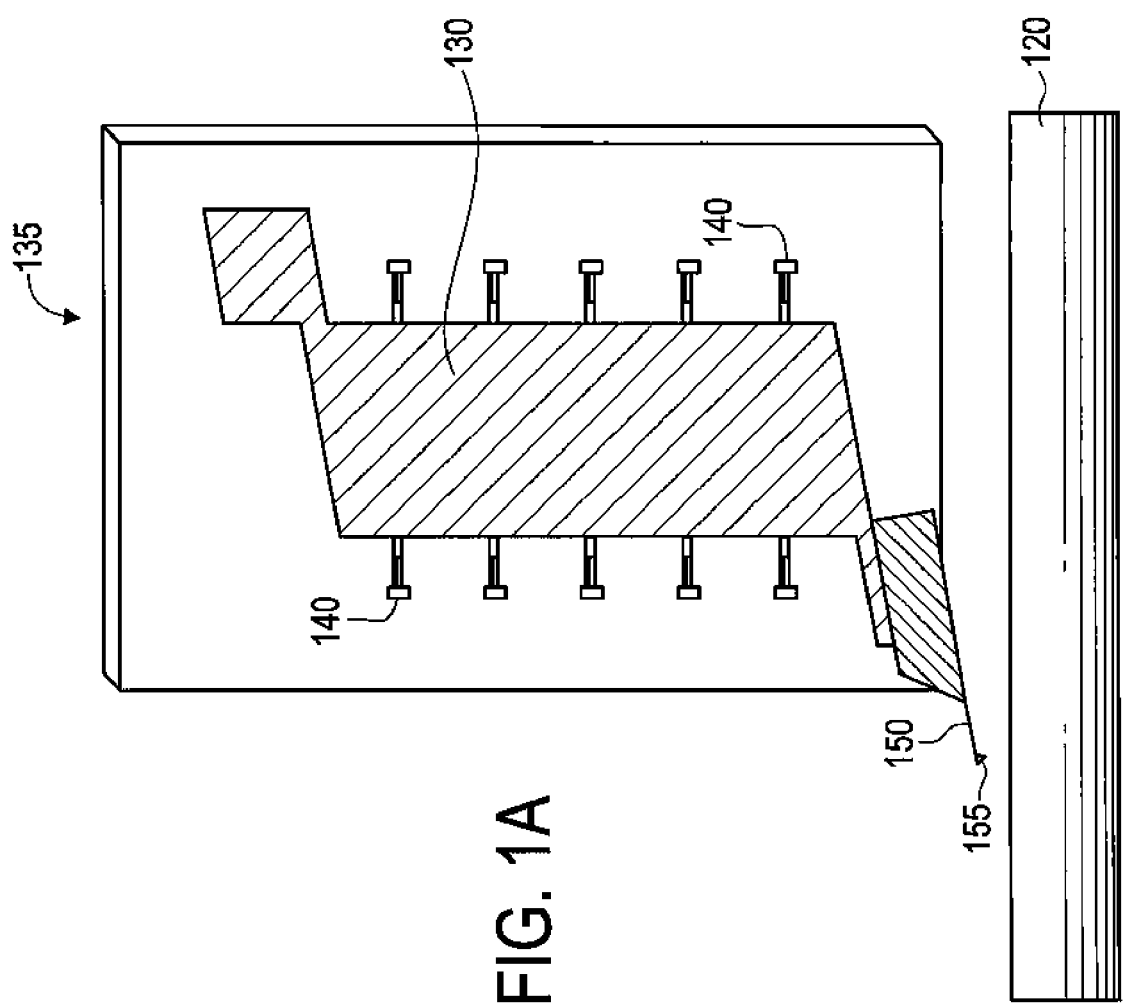

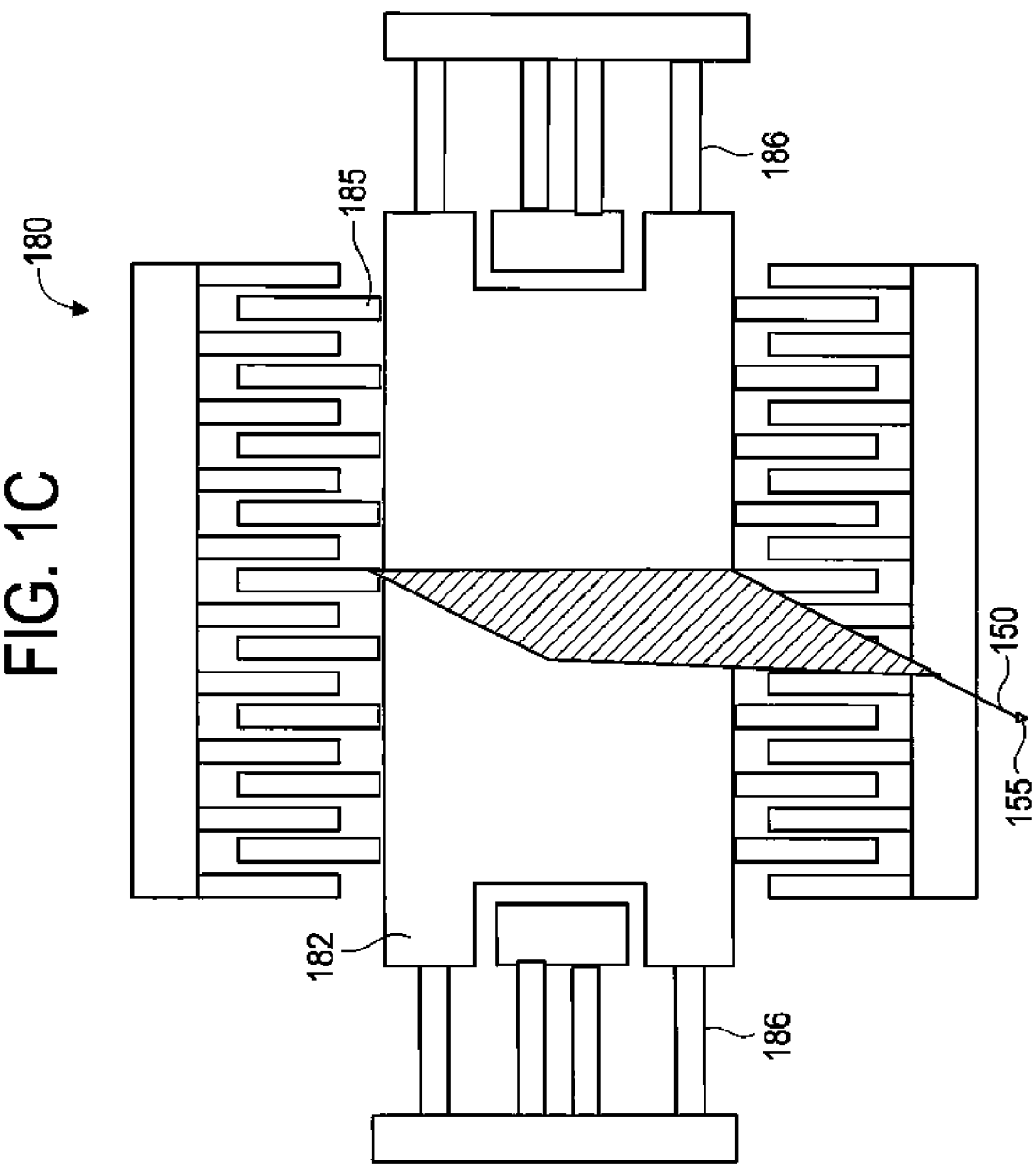

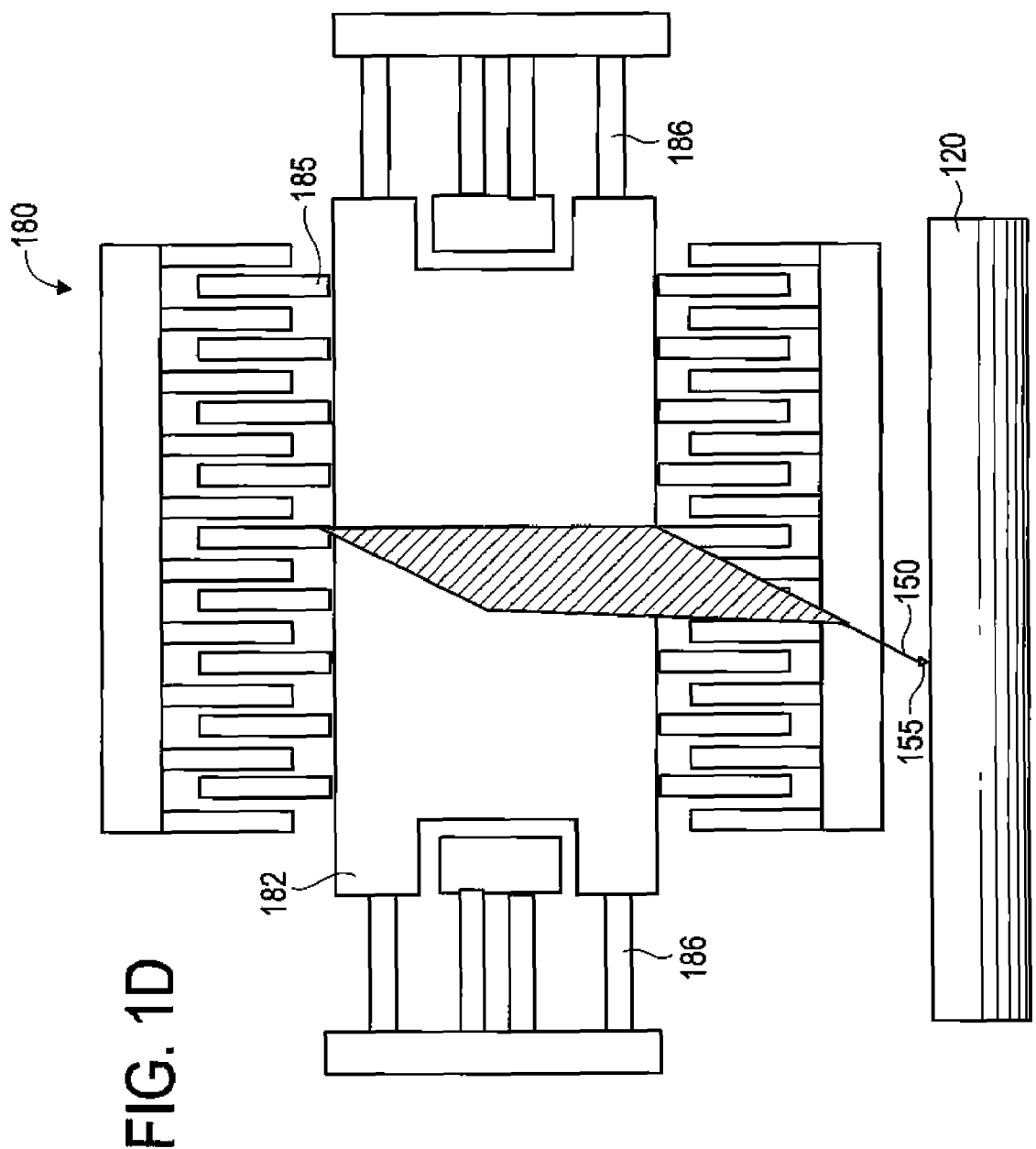

FORCE METHOD FOR DETERMINING THE SPRING CONSTANT OF SCANNING PROBE MICROSCOPE CANTILEVERS USING MEMS ACTUATORS

CROSS REFERENCE TO RELATED APPLICATIONS

This application relates to the co-pending application Ser. No. 11/458,000 filed on the sample day entitled "Resonance Method for Determining the Spring Constant of Scanning Probe Microscope Cantilevers using MEMS Actuators" by Workman, and Hoen, and Ser. No. 11/458,012 filed on the same day and entitiled "Displacement Method for Determining the Spring Constant of Scanning Probe Microscope Cantilevers using MEMS Actuators" by Workman, Hoen, and Clifford, both owned by the assignee of this application and both incorporated herein by reference.

BACKGROUND

Typically, it is difficult to measure the vertical and lateral spring constant of scanning probe microscope cantilevers accurately. The typical method of calibrating scanning probe microscope (SPM) cantilevers is the "Sader method", described, for example, by Sader, Chon and Mulvaney in "Calibration of rectangular atomic force microscopy cantilevers", Review of Scientific Instruments, 70(10), p. 3967, 1999 or by Cain et al. in "Force calibration in lateral force microscopy", Journal of Colloid and Interface Science 227, p. 55, 2000. The "Sader method uses the length, width, resonance frequency, and quality factor, Q, of the scanning probe microscope cantilever to determine the spring constant. The "Sader method" does not depend on the optical lever sensitivity calibration.

Other methods for determining the spring constant include the thermal power spectral density method described by Hutter and Bechhoefer in "Calibration of atomic-force microscope tips", Review of Scientific Instruments, 64(7), p. 1868, 1993; the "Cleveland method", described by Cleveland in "A non-destructive method for determining the spring constant of cantilevers for scanning force microscopy", Review of Scientific Instruments, 64, p. 403, 1993; and the torsional MEMS method, described by Cumpson et al. in "Microelectromechanical system device for calibration of atomic force microscope cantilever spring constants between 0.01 and 4 N/m", Journal of Vacuum Science and Technology A, 22(4), p. 1444, 2004.

SUMMARY

In accordance with the invention, the spring constant of a scanning probe microscope cantilever mechanically coupled to a MEMs actuator may be determined in-situ by application of a force to the scanning probe microscope cantilever.

BRIEF DESCRIPTION OF THE DRAWINGS

FIG. 1a shows a scanning probe microscope cantilever attached to electrostatic MEMS motor rotor in accordance with the invention.

FIG. 1c shows a scanning probe microscope cantilever attached to the electrostatic comb drive rotor of an electrostatic comb drive in accordance with the invention.

FIG. 1d shows a scanning probe microscope cantilever attached to the electrostatic comb drive rotor in contact with a surface in accordance with the invention.

DETAILED DESCRIPTION

Figure 1B:
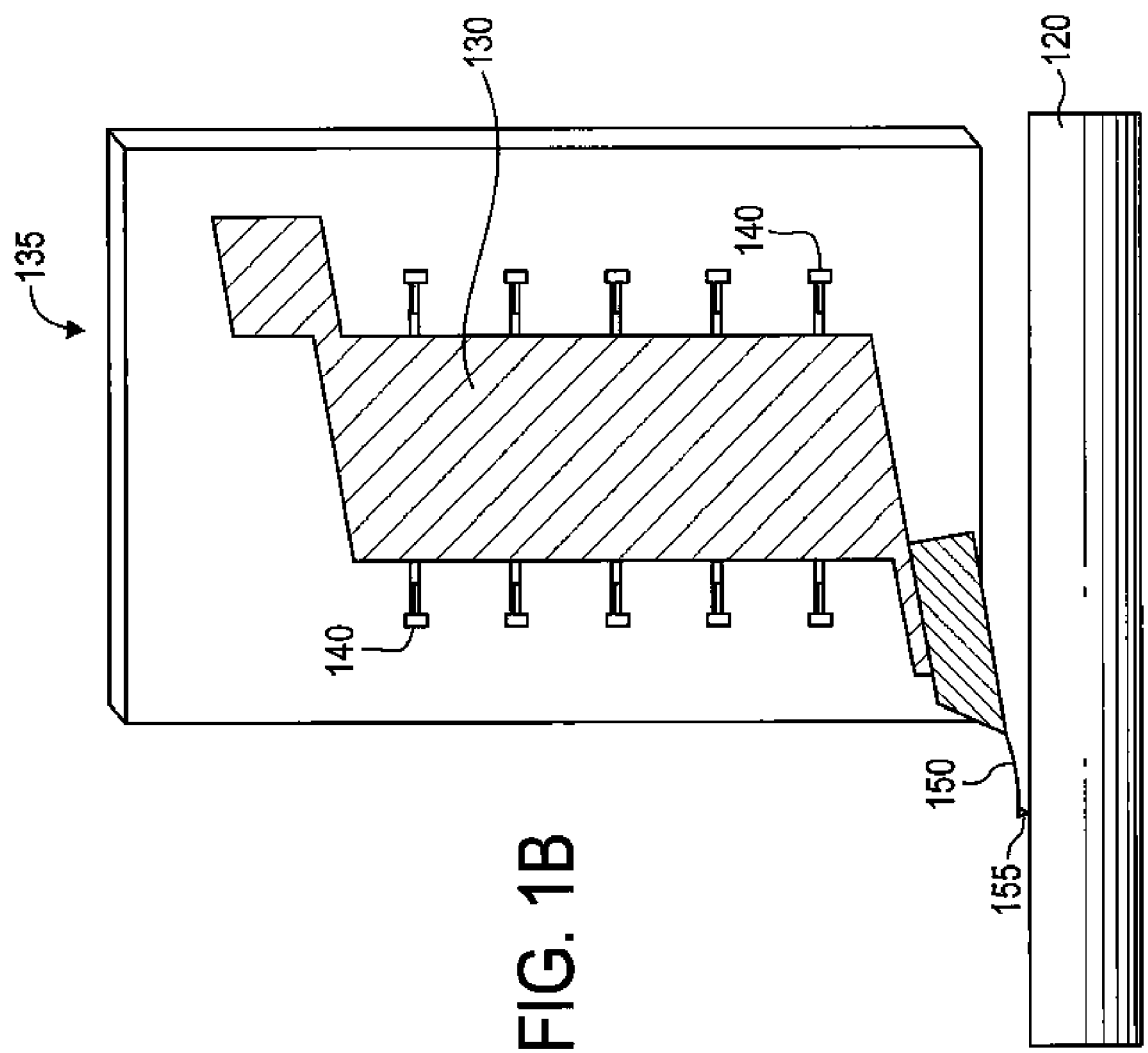
FIG. 1b shows a scanning probe microscope cantilever attached to the electrostatic MEMS motor rotor in contact with a surface in accordance with the invention.

FIG. 1a shows scanning probe microscope cantilever 150 attached to electrostatic MEMS motor rotor 130 in accordance with the invention. FIG. 1b shows scanning probe microscope cantilever 150 attached to electrostatic MEMS motor rotor 130 in contact with surface 120. Scanning probe microscope cantilever 150 is attached to electrostatic MEMS motor rotor 130 such that scanning probe microscope cantilever 150 extends past the boundary of electrostatic MEMS motor rotor 130 to allow the use of, for example, an optical lever technique to monitor the vertical position of scanning probe tip 155.

Other MEMS actuators may be used in accordance with the invention. For example, an electrostatic comb drive may be used in place of electrostatic MEMS motor 135. FIG. 1c shows scanning probe microscope cantilever 150 attached to electrostatic comb drive rotor 182 of electrostatic comb drive 180 in an embodiment in accordance with the invention. Scanning probe microscope cantilever 150 is attached to electrostatic comb drive rotor 130 such that scanning probe microscope cantilever 150 extends past the boundary of electrostatic comb drive rotor 182 to allow the use of, for example, an optical lever technique to monitor the vertical position of scanning probe tip 155. FIG. 1d shows scanning probe microscope cantilever 150 attached to electrostatic comb drive rotor 182 of electrostatic comb drive 180 in contact with surface 120.

Figure 2B:
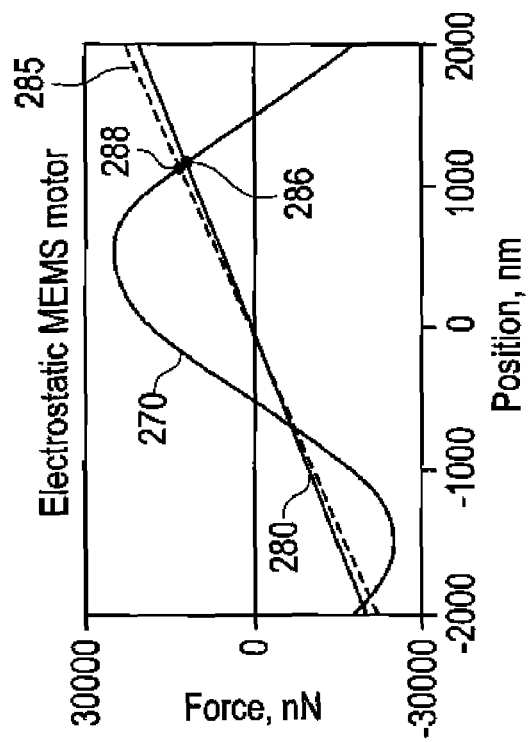
FIG. 2b shows the force versus position for an electrostatic MEMS motor in accordance with the invention.
Figure 2A:
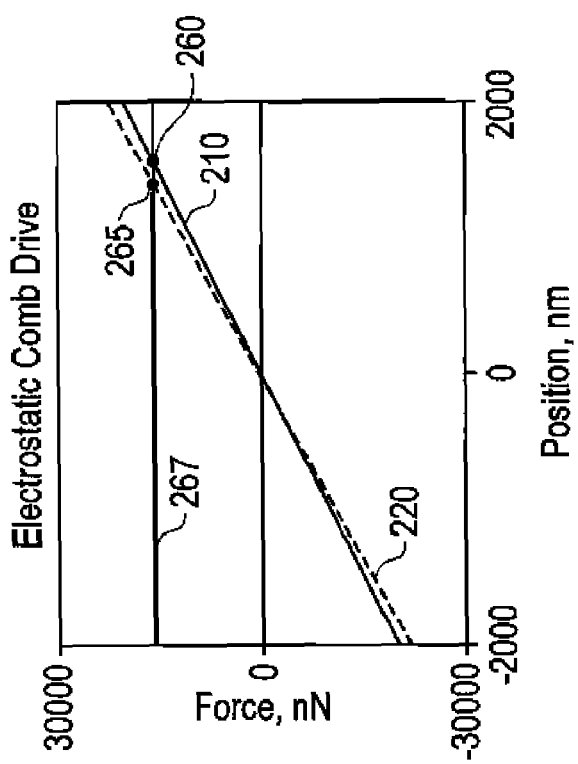
FIG. 2a shows the force versus position for an electrostatic comb drive in accordance with the invention.

The particular electrostatic MEMS actuator selected effects the relationship between the measured frequencies and the spring constant, $\kappa_{tip}$, of scanning microscope cantilever 150. FIGS. 1a and 1b show electrostatic MEMS motor 135 which is a surface drive actuator while FIGS. 1c and 1d show electrostatic comb drive 180. FIGS. 2a and 2b show force versus position curves for electrostatic comb drive 180 and electrostatic MEMS motor rotor 135, respectively. For both electrostatic comb drive 180 and electrostatic MEMS motor 135, the force versus position curves are the sum of three components: the force of springs 140 or springs 186 that constrain electrostatic MEMS motor rotor 130 or electrostatic comb drive rotor 182, the electrostatic force generated by electrostatic MEMS motor rotor 130 or electrostatic comb drive rotor 182 and the force from scanning probe microscope cantilever 150 or scanning probe microscope cantilever 150, respectively. The force from scanning probe microscope cantilever 150 is present only if scanning probe tip 155 is in contact with surface 120.

For electrostatic comb drive 180 as described by, for example, R. Legtenberg, A. W. Groeneveld and M. Elwenspoek in "Comb-drive actuators for large displacements", Journal of Micromechanics and Microengineering, 6, pp. 320-329, 1996, incorporated by reference, the electrostatic force can be approximated as follows:

$$F \approx \frac{\varepsilon_0 L V_{applied}^2}{d} \quad (1)$$

where L is the sum of the thicknesses of all comb fingers 185 in electrostatic comb drive 180. From Equation (1), it can be seen that the electrostatic force, F, is essentially independent of position. At equilibrium, the electrostatic force is equal to and the negative of the spring forces contributed by springs 186 and scanning probe microscope cantilever 150. This allows the rest position of electrostatic comb drive 180 to be determined by considering where the negative of the spring forces are equal to the force generated by electrostatic comb drive 180. In FIG. 2*a*, curve 210 shows the negative of the spring forces as a function of position when scanning probe tip 150 is not in contact with surface 120 and curve 220 shows the negative spring forces as a function of position when scanning probe tip is in contact with surface 120. When scanning probe microscope cantilever 150 is not in contact with surface 120, the equilibrium position of electrostatic comb drive 180 is shown by non-contact point 260 in FIG. 2*a*. When scanning probe tip 150 is in contact with surface 120, an additional spring force is added due to the spring force contributed by scanning probe microscope cantilever 155 and the equilibrium position of electrostatic comb drive 180 moves and is shown by contact point 265 in FIG. 2*a*. Because force curve 267 for electrostatic comb drive 180 is essentially independent of position, changes in resonant frequency are due to the spring force contributed by scanning probe microscope cantilever 155 when scanning probe tip 150 is in contact with surface 120.

For electrostatic MEMS motor 135 as described in, for example, U.S. Pat. No. 5,986,381, incorporated by reference, the electrostatic force is not independent of position. The electrostatic force is typically periodic with the rotor position and for electrostatic MEMS motor rotor 130 the electrostatic force is a sinusoidal function of position as shown by curve 270 in FIG. 2*b*. The amplitude of the electrostatic force depends on the applied voltage and the position of the zero crossing depends on the specific voltage pattern applied to electrostatic MEMS motor 135. In FIG. 2*b*, the variation of the force of springs 140 with position is shown by curve 280 and the force of springs 140 plus the force due to the contact of scanning probe tip 155 in contact with surface 120 with position is shown by curve 285. Electrostatic MEMS motor 135 is at rest in equilibrium position 286 when scanning probe tip 155 is not in contact with surface 120. Equilibrium position 286 occurs where curve 680 intersects curve 670. When scanning probe tip 155 is in contact with surface 120, an additional spring force due to scanning microscope cantilever 150 results in new equilibrium position 288 which is where curve 285 intersects curve 270. Equilibrium position 286 and the associated resonance frequency depend on the functional form of the electrostatic force curve. For small changes in position as shown in FIG. 2*b*, electrostatic force curve 270 can be approximated as a straight line.

Figure 1E:
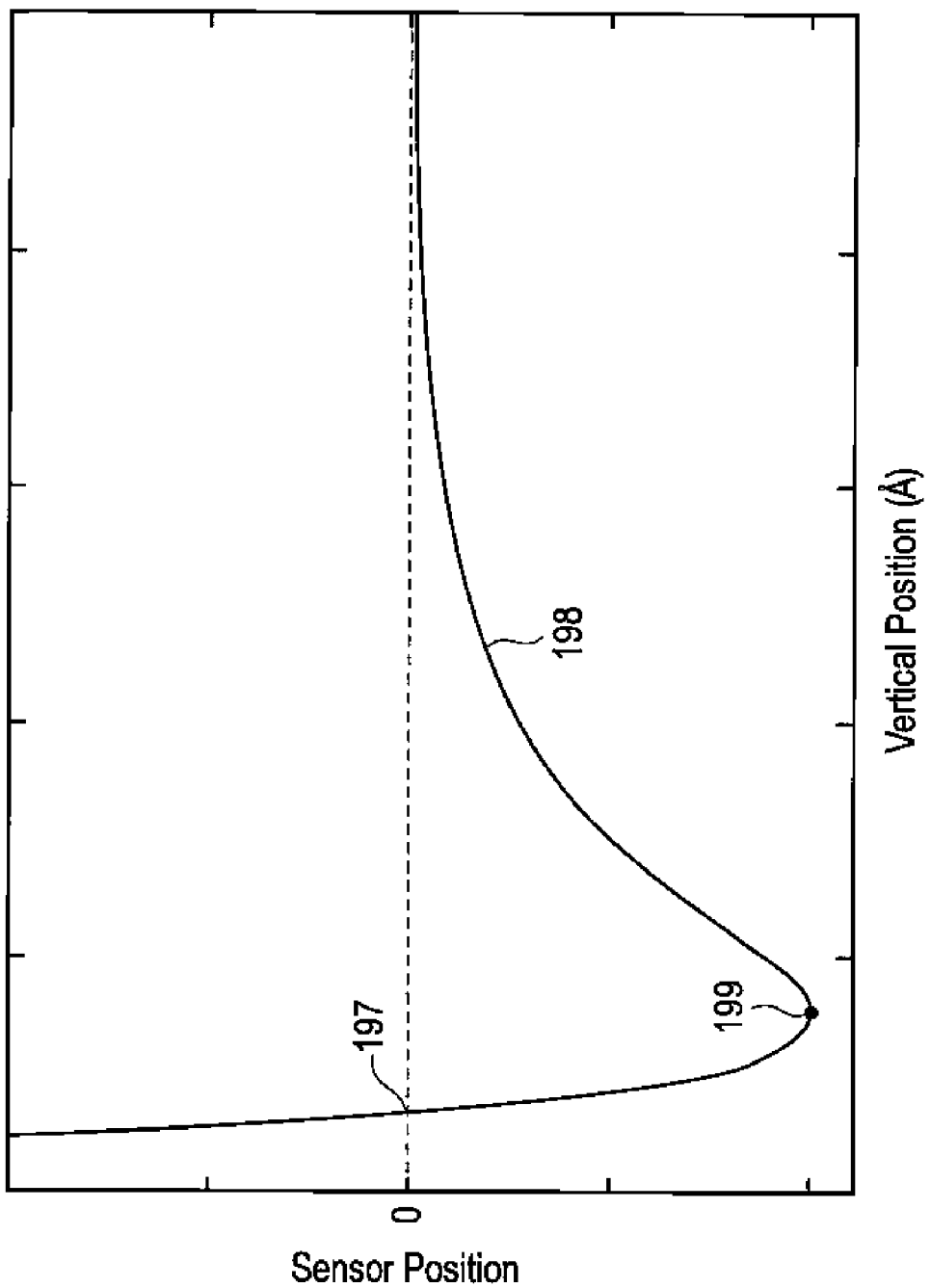
FIG. 1e shows the sensor position versus vertical probe position.

Note, for the purposes of this description, contact between scanning probe tip 155 and surface 120 is defined as when the vertical position of scanning probe tip 155 is to the left of inflection point 199 of probe-surface interaction force 198 as shown in FIG. 1*e*. Note that the sensor position is proportional to probe-surface interaction force 198. Surface 120 is assumed to be sufficiently "hard" that scanning probe tip 155 moves less than about 10 percent as much as electrostatic MEMS motor rotor 130 or electrostatic comb drive rotor 182 when scanning probe tip 155 is brought in contact with surface 120. The term "sensor position" refers to the position of the reflected optical beam on the bi-cell photodetector as described, for example, in U.S. Pat. No. 5,587,523 and incorporated herein by reference. The position of the reflected optical beam can be used to determine the vertical position of scanning probe tip 155. To simplify the discussion, the sensor is positioned so the zero of the sensor position readout corresponds to the situation when there are no surface forces acting on scanning probe tip 155 and corresponds to point 197 in FIG. 1*e*.

In accordance with the invention, a method for determining the spring constant, $\kappa_{tip}$, of scanning microscope cantilever 150 does not require the application of a voltage to electrostatic MEMS motor rotor 130 or electrostatic comb drive rotor 182. This removes the apparent addition of the "electrical" stiffness due to the applied voltage to the suspension stiffness. This method typically provides a greater spring constant ratio, $\kappa_{tip}/\kappa_m$, because $\kappa_m$ is smaller with no applied voltage.

The measurement is performed with no voltage applied to electrostatic MEMS motor rotor 130 or electrostatic comb drive rotor 182. Surface 120 is raised until contact occurs with scanning probe tip 155. Then any two of the following three quantities is determined as surface 120 is raised to apply a force, F, to scanning probe tip 155: the further vertical movement of surface 120, $\Delta y_s$, the deflection of electrostatic MEMS motor rotor 130 or electrostatic comb drive rotor 182, $\Delta y_m$ when surface 120 is further raised by $\Delta y_s$, and the deflection of scanning cantilever 150 with respect to electrostatic MEMS motor rotor 130 or electrostatic comb drive rotor 182, $\Delta y_c$. This allows determination of the spring constant, $\kappa_{tip}$ of scanning microscope cantilever 150 when $\kappa_m$ is determined as above. Because $\Delta y_s = \Delta y_c + \Delta y_m$, any two of the above measurements yield the third quantity. Applying the relationship $\kappa_m \Delta y_m = \kappa_{tip} \Delta y_c$, $\kappa_{tip}$ of scanning microscope cantilever 150 is given by:

$$\kappa_{tip} = \frac{\kappa_m \Delta y_m}{\Delta y_c} \quad (2)$$

Note that this method can be used even if surface 120 is not in contact with scanning probe tip 155 as long as surface 120 interacts with scanning probe tip 155. For example, scanning probe tip 155 may be brought sufficiently close to surface 120 without making contact with surface 120 to allow the effect of the van der Waals force to act on scanning probe tip 155. Other forces such as electrostatic forces or magnetic forces can be used to apply a force to scanning probe tip 155 in accordance with the invention. Note that the magnitude of the force need not be known.

Figure 3:
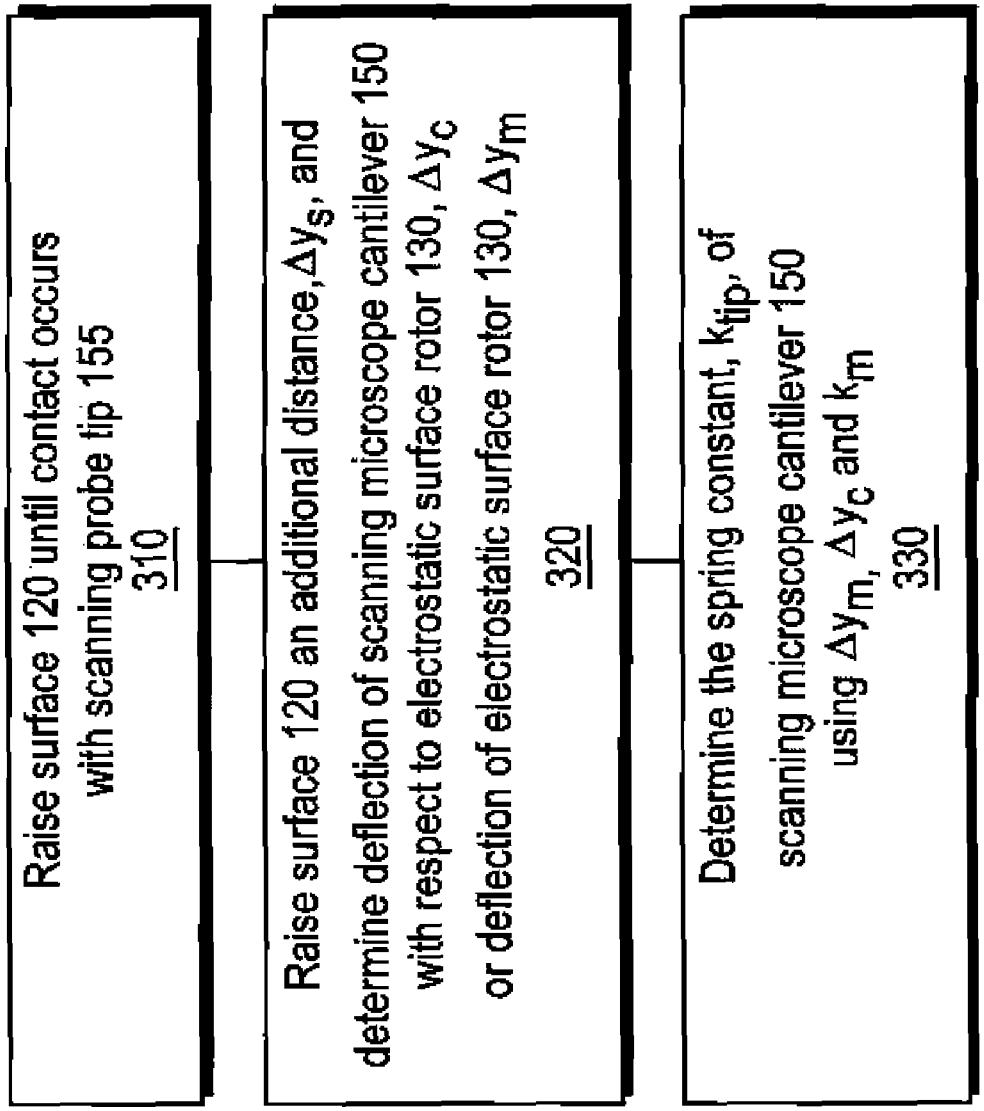
FIG. 3 shows an embodiment in accordance with the invention.

FIG. 3 shows an embodiment in accordance with the invention. Initially, in step 310, surface 120 is raised until surface 120 interacts with scanning probe tip 155. In step 320, surface 120 is raised an additional distance, $\Delta y_s$, and the deflection of scanning cantilever 150 with respect to electrostatic MEMS motor rotor 130, $\Delta y_c$, is determined or deflection of electrostatic MEMS motor rotor 130, $\Delta y_m$, is determined. Alternatively, $\Delta y_m$ and $\Delta y_c$ may be determined directly without explicitly determining $\Delta y_s$ or raising surface 120 an additional distance, $\Delta y_s$ as noted above. Then, in step 330, spring constant, $\kappa_{tip}$, of scanning microscope cantilever 150 may be determined from $\Delta y_m$, $\Delta y_c$ and $\kappa_m$. For electrostatic comb drive 180, electrostatic comb drive rotor 182 replaces electrostatic MEMS motor rotor 130 in the above discussion of FIG. 3.

Figure 4:
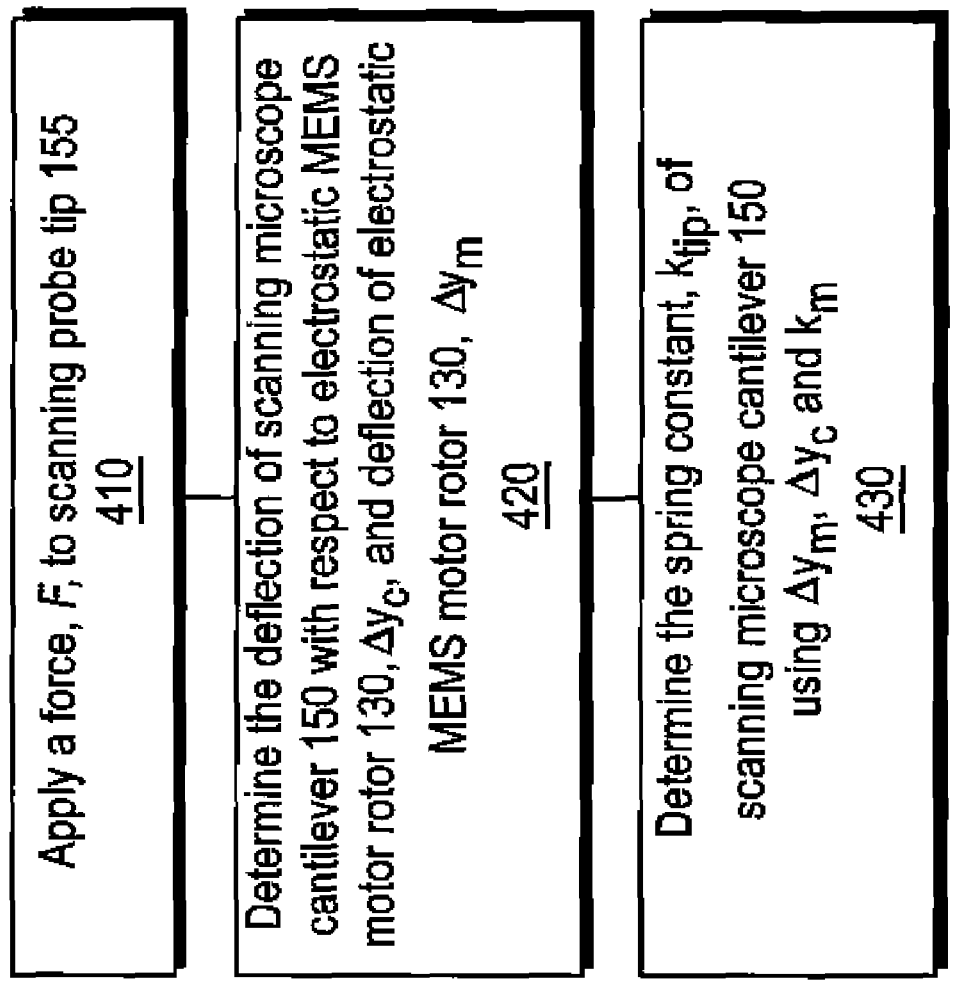
FIG. 4 shows an embodiment in accordance with the invention.

FIG. 4 shows another embodiment in accordance with the invention. Initially, in step 410, a force, F, is applied to scanning probe tip 155 with scanning probe tip 155. As noted above, a force may be applied to scanning probe tip 155 by bringing scanning probe tip 155 sufficiently close to surface 120 without making contact to allow the effect of the van der Waals force to act on scanning probe tip 155. Other forces such as electrostatic forces or magnetic forces may be used to apply a force to scanning probe tip 155 in accordance with the invention. In step 420, the resulting deflection of scanning cantilever 150 with respect to electrostatic MEMS motor rotor 130 or electrostatic comb drive rotor 182, $\Delta y_c$, is determined and the resulting deflection of electrostatic MEMS motor rotor 130, $\Delta y_m$, is determined due to force, F. Then in step 430, spring constant, $\kappa_{tip}$, of scanning microscope cantilever 150 may be determined from $\Delta y_m$, $\Delta y_c$ and $\kappa_m$ as shown in Eq. (2).

In another embodiment in accordance with the invention, the spring constant, $\kappa_{tip}$, of scanning microscope cantilever 150 in contact with surface 120 may also be determined by application of a known applied force, F, using, for example, electrostatic MEMS motor 135 or electrostatic comb drive 180 that has been calibrated. Because $$F = -(\kappa_{tip} + \kappa_m)\Delta y_m \tag{3}$$

where $\Delta y_m$ is the deflection of electrostatic MEMS motor rotor 130 or electrostatic comb drive rotor 182, the spring constant, $\kappa_{tip}$, of scanning microscope cantilever 150 is given by:

$$\kappa_{tip} = -\kappa_m + F/\Delta y_m \tag{4}$$

Figure 5:
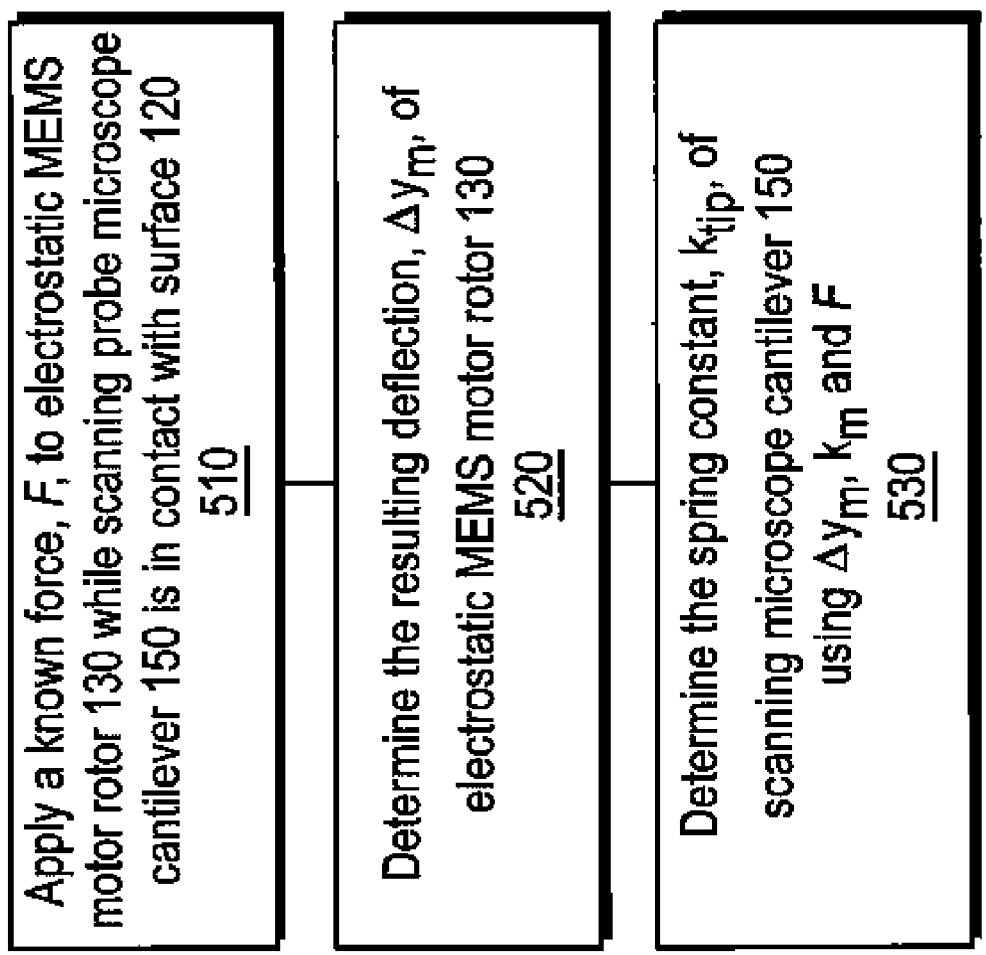
FIG. 5 shows an embodiment in accordance with the invention.

FIG. 5 shows the steps of an embodiment in accordance with the invention. In step 510, a known force, F, is applied to electrostatic MEMS motor rotor 130 while scanning microscope cantilever 150 is in contact with surface 120. In step 520, the resulting deflection, $\Delta y_m$, of deflection of electrostatic MEMS motor rotor 130 is determined. In step 530, the spring constant, $\kappa_{tip}$, of scanning microscope cantilever 150 is determined. For electrostatic comb drive 180, electrostatic comb drive rotor 182 replaces electrostatic MEMS motor rotor 130 in the above discussion of FIG. 5.

There are a number of ways to obtain the spring constant, $\kappa_m$, of springs 140 or springs 186 in accordance with the invention. $\kappa_m$ may be measured directly using a force and displacement measuring device where a given force is applied to electrostatic MEMS motor rotor 130 or electrostatic comb drive rotor 182 and the resulting displacement is measured. The force, F, may be applied by pushing on electrostatic MEMS motor rotor 130 or electrostatic comb drive rotor 182 with a calibrated micro-force sensor while the displacement, $\Delta y$, is measured optically using a KEYENCE optical retro-reflective laser displacement sensor so that no external loading is introduced and $\kappa_m = F/\Delta y$. Alternatively, the force, F, can be calculated from the known geometry of electrostatic MEMS motor 135 or electrostatic comb drive 180 and the applied voltage, $V_{applied}$, as the force, F, is typically proportional to the applied voltage, $V_{applied}$.

Figure 6:
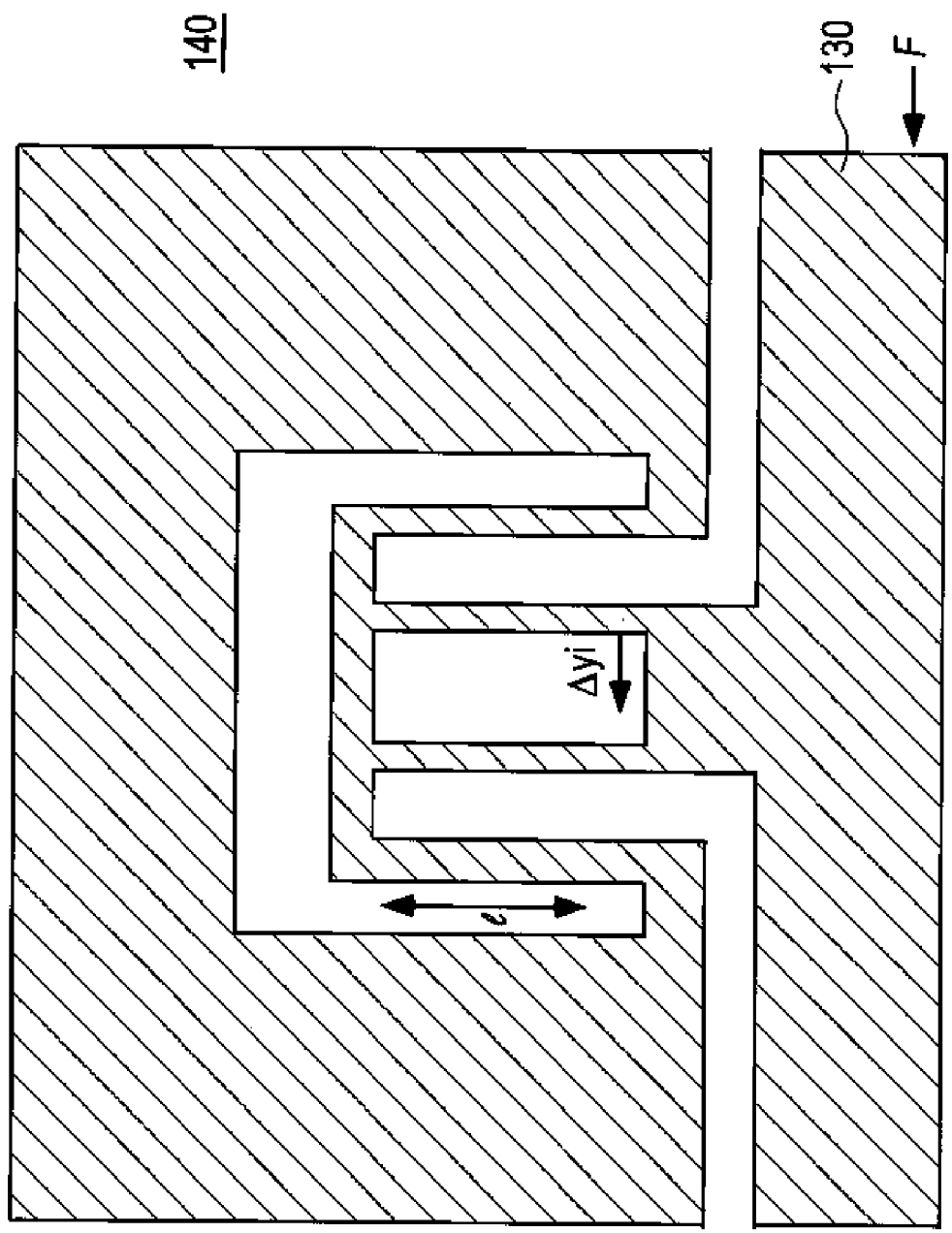
FIG. 6 shows a spring of the electrostatic MEMS motor rotor in accordance with the invention.

$\kappa_m$ may be calculated from the dimensions of springs 140 of electrostatic MEMS motor 135 and knowledge of Young's modulus, E, for the spring material. For example, with reference to FIG. 6, for one spring 140, the deflection $\Delta y_i$ is given by:

$$\Delta y_i = \frac{Fl^3}{12EI} \tag{5}$$

where l is the spring length and I is the moment of inertia of the spring cross-section. For electrostatic MEMS motor rotor 130 which has ten springs 140:

$$\Delta y = \frac{5Fl^3}{6EI} \tag{6}$$

so that:

$$\kappa_m = \frac{6EI}{5l^3} \tag{7}$$

Similarly, for electrostatic comb drive 180 (see FIG. 1c-d), $\kappa_m$, be calculated from the dimensions of springs 186 and knowledge of Young's modulus, E, for the spring material. This gives:

$$\kappa_m = \frac{2EI}{l^3} \tag{8}$$

for the two springs of FIG. 1c, where l is the spring length and I is the moment of inertia of the spring cross-section.

$\kappa_m$ may also be calculated by measuring the resonance frequency, $\omega_n$, of springs 140 or springs 186 and the mass, $m_r$, of electrostatic MEMS motor rotor 130 or electrostatic comb drive rotor 182 which may include the mass of springs 140 or springs 186, respectively, if significant. It is typically difficult to measure the mass of electrostatic MEMS motor rotor 130 or electrostatic comb drive rotor 182. The mass may be calculated from the volume which is measurable or electrostatic MEMS motor rotor 130 or electrostatic comb drive rotor 182 may be detached and weighed. Typically, the variation in mass from one electrostatic MEMS motor rotor 130 or electrostatic comb drive rotor 182 to another within a wafer is small and the largest variation is due to the variable thickness between different wafers. The spring constant is highly variable between wafers because it depends on the cube of the width of springs 140 or springs 186 and varies due to processing. The resonance frequency, $\omega_n$, may be measured by observing the response of electrostatic MEMS motor rotor 130 or electrostatic comb drive rotor 182 to a step, pulse or swept-sine forcing function. Measurement of the resonance frequency, $\omega_n$, is performed using a sensor which does not affect the result such as an optical or capacitive sensor.

In particular, one way to determine the resonance frequency, $\omega_n$, of electrostatic MEMS rotor motor 130 is to apply a low voltage sine wave, typically about 0.025 of the overall bias voltage, to the disrupter electrode (not shown, see for example, U.S. Pat. No. 5,986,381) of electrostatic motor 135. The voltage signal from the capacitive position sensor (not shown) is then multiplied by the applied sine wave voltage and averaged over several periods to produce a sine mixed signal. The voltage signal from the capacitive position sensor is also multiplied by a signal that is 90 degrees out of phase with the applied sine wave voltage and average over several periods to produce a cosine mixed signal. The sine mixed signal is combined in quadrature with the cosine mixed signal to give the signal magnitude. The frequency of the applied sine wave voltage is then typically varied by several hertz, to determine the signal magnitude as a function of frequency. The resonant frequency occurs when the signal magnitude is a maximum. Alternatively, the resonant frequency may be found by noting the frequency where the sine mixed signal crosses zero.

Similar methods for determining the resonance frequency, $\omega_n$, may be used for other MEMS actuators such as electrostatic comb drive 180 where the mass of electrostatic comb drive rotor 182 is used in place of the mass of electrostatic MEMS motor rotor 130.

Because applying a voltage to electrostatic MEMS motor rotor 130 or electrostatic comb drive rotor 182 typically increases the apparent suspension stiffness, the same voltage, $V_{applied}$, should be applied to electrostatic MEMS motor rotor 130 or electrostatic comb drive rotor 182 during the measurement. An estimate of the effective spring constant for springs 140 or springs 186 is then:

$$\kappa_m \approx m_r \omega_n^2 \qquad (9)$$

Note that when a voltage, $V_{applied}$, is applied to electrostatic MEMS motor rotor 130 or electrostatic comb drive rotor 182, the spring constant, $\kappa_m$, includes the effects of both the applied voltage, $V_{applied}$ and springs 140 or springs 186.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A method for determining a spring constant of a scanning probe microscope cantilever mechanically coupled to a MEMS actuator having an actuator spring constant comprising:
    applying a force to a scanning probe tip mechanically coupled to said scanning probe cantilever;
    determining a first deflection comprising a deflection of said MEMS actuator in response to said force; and
    determining said spring constant using said first deflection and said actuator spring constant.

2. The method of claim 1 wherein said force is known.

3. The method of claim 1 further comprising
    determining a second deflection comprising a deflection of said scanning probe microscope cantilever with respect to said MEMS actuator in response to said force and determining said spring constant using said first deflection, said second deflection and said actuator spring constant.

4. The method of claim 3 wherein said force is applied by bringing said scanning probe tip into contact with a surface and then moving said surface a first distance toward said scanning probe tip.

5. The method of claim 3 wherein said force is applied by bringing said scanning probe tip sufficiently close to a surface such that a van der Waals force deflects said scanning probe tip.

6. The method of claim 3 wherein said force is applied by bringing said scanning probe tip into contact with a surface and actuating said MEMS actuator to deflect said MEMS actuator a first distance toward said surface.

7. The method of claim 1 wherein said MEMS actuator comprises an electrostatic MEMS motor rotor.

8. The method of claim 1 wherein said MEMS actuator comprises an electrostatic comb drive rotor.

9. The method of claim 1 wherein said MEMS actuator comprises an electromagnetic drive.

10. The method of claim 1 wherein said actuator spring constant is calculated.

11. The method of claim 10 wherein said actuator spring constant is calculated using a measured resonance frequency.

12. The method of claim 10 wherein said resonance frequency is measured by observing a response of said MEMS actuator to a forcing function selected from a group consisting of a step function, a pulse function and a swept-sine function.

13. The method of claim 10 wherein said actuator spring constant is calculated using a Young's modulus.

14. A method for determining a spring constant of a scanning probe microscope cantilever mechanically coupled to an electrostatic MEMS motor rotor having an actuator spring constant comprising:
    applying a force to a scanning probe tip mechanically coupled to said scanning probe cantilever;
    determining a first deflection comprising a deflection of said electrostatic MEMS motor rotor and a second deflection comprising a deflection of said scanning probe microscope cantilever with respect to said electrostatic MEMS motor rotor in response to said force; and
    determining said spring constant using said first deflection, said second deflection and said actuator spring constant.

15. The method of claim 14 wherein said force is applied by bringing said scanning probe tip into contact with a surface and then moving said surface a first distance toward said scanning probe tip.

16. The method of claim 14 wherein said force is applied by bringing said scanning probe tip into contact with a surface and actuating said electrostatic MEMS motor rotor to deflect said electrostatic MEMS motor rotor a first distance toward said surface.

17. The method of claim 14 wherein said force is applied by bringing said scanning probe tip sufficiently close to a surface such that a van der Waals force deflects said scanning probe tip.

18. A method for determining a spring constant of a scanning probe microscope cantilever mechanically coupled to an electrostatic comb drive rotor having an actuator spring constant comprising:
    applying a force to a scanning probe tip mechanically coupled to said scanning probe cantilever;
    determining a first deflection of said electrostatic comb drive rotor and a second deflection of said scanning probe microscope cantilever with respect to said electrostatic comb drive rotor in response to said force; and
    determining said spring constant using said first deflection, said second deflection and said actuator spring constant.

19. The method of claim 18 wherein said force is applied by bringing said scanning probe tip into contact with a surface and then moving said surface a first distance toward said scanning probe tip.

20. The method of claim 18 wherein said force is applied by bringing said scanning probe tip into contact with a surface and actuating said electrostatic comb drive rotor to deflect said electrostatic comb drive rotor a first distance toward said surface.

* * * * *